US012342886B2

(12) United States Patent
Schiller

(10) Patent No.: US 12,342,886 B2
(45) Date of Patent: Jul. 1, 2025

(54) GARMENTS AND ARTICLES INCORPORATING RECYCLED FOAM SCRAP

(71) Applicant: NIKE, Inc., Beaverton, OR (US)

(72) Inventor: Denis Schiller, Vancouver, WA (US)

(73) Assignee: NIKE, Inc., Beaverton, OR (US)

( * ) Notice: Subject to any disclaimer, the term of this patent is extended or adjusted under 35 U.S.C. 154(b) by 179 days.

(21) Appl. No.: 17/860,802

(22) Filed: Jul. 8, 2022

(65) Prior Publication Data

US 2023/0011099 A1 Jan. 12, 2023

Related U.S. Application Data

(60) Provisional application No. 63/220,719, filed on Jul. 12, 2021.

(51) Int. Cl.
| | | |
|---|---|---|
| *A43B 1/00* | (2006.01) | |
| *A41D 13/05* | (2006.01) | |
| *A41D 31/02* | (2019.01) | |
| *A41D 31/06* | (2019.01) | |
| *A63B 71/08* | (2006.01) | |

(52) U.S. Cl.
CPC ....... *A41D 31/065* (2019.02); *A41D 13/0593* (2013.01); *A41D 31/02* (2013.01); *A41D 2400/10* (2013.01); *A43B 1/0063* (2013.01); *A63B 71/08* (2013.01)

(58) Field of Classification Search
CPC ...... A41D 31/06; A41D 31/38; A41D 13/015; A43B 1/0063
See application file for complete search history.

(56) References Cited

U.S. PATENT DOCUMENTS

| 5,545,128 A * | 8/1996 | Hayes | A41D 13/0568 |
| | | | 602/61 |
| 6,032,300 A * | 3/2000 | Bainbridge | A41D 31/28 |
| | | | 5/655.4 |
| 2002/0090504 A1* | 7/2002 | Bainbridge | A63B 71/08 |
| | | | 428/304.4 |
| 2005/0025956 A1* | 2/2005 | Bainbridge | A41D 31/28 |
| | | | 428/317.7 |

(Continued)

FOREIGN PATENT DOCUMENTS

| BR | 102014018098 A2 | 2/2015 |
| DE | 3806456 A1 | 11/1989 |

(Continued)

OTHER PUBLICATIONS

Kolsen, Most Elastic Particle FOam Expanded THermoplastic Polyurethane, Apr. 2, 2021, trupolymer.com, https://www.tpupolymer.com/blog/most-elastic-particle-foam-expanded-thermoplastic-polyurethane_b7, (last visited Jun. 5, 2024). (Year: 2021).*

(Continued)

*Primary Examiner* — Patrick J. Lynch
(74) *Attorney, Agent, or Firm* — Shook, Hardy & Bacon L.L.P.

(57) ABSTRACT

This disclosure is related to garments and methods of producing garments that incorporate filling materials that comprise multi-faceted particles, including multi-faceted foam particles, produced by shredding various components associated with, for example, articles of footwear, pads (athletic use pads, industrial use pads, and the like), and the like.

19 Claims, 5 Drawing Sheets

(56) References Cited

U.S. PATENT DOCUMENTS

| | | | | |
|---|---|---|---|---|
| 2012/0095419 | A1* | 4/2012 | Riesinger | A61F 13/01029 |
| | | | | 604/377 |
| 2018/0144410 | A1* | 5/2018 | Wyner | A41D 13/015 |
| 2020/0196689 | A1* | 6/2020 | Clarke | A41D 31/065 |
| 2021/0078276 | A1* | 3/2021 | Baghdadi | B32B 7/12 |
| 2021/0145116 | A1* | 5/2021 | Kvamme | B29D 35/122 |

FOREIGN PATENT DOCUMENTS

| | | | | |
|---|---|---|---|---|
| EP | 1025767 A2 | 8/2000 | | |
| EP | 2426047 A2 * | 3/2012 | | A41D 13/015 |
| EP | 3657970 A1 | 6/2020 | | |
| EP | 4104803 A1 | 12/2022 | | |
| WO | 2010/073921 A1 | 7/2010 | | |

OTHER PUBLICATIONS

International Search Report and Written Opinion received for PCT Patent Application No. PCT/US2022/073634, mailed on Oct. 20, 2022, 15 pages.

Third Party Observation received for European U.S. Appl. No. 22/755,035, mailed on Nov. 22, 2024, 3 pages.

\* cited by examiner

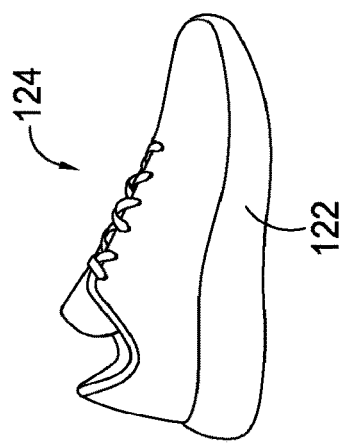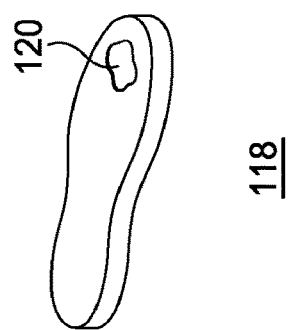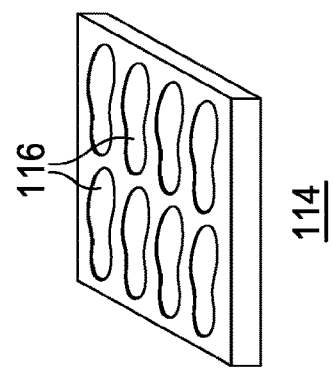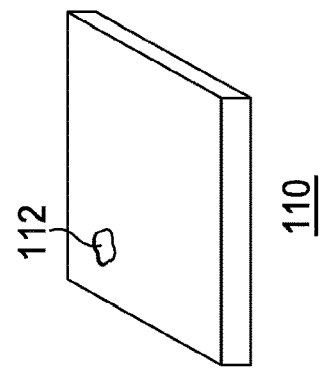
FIG. 1

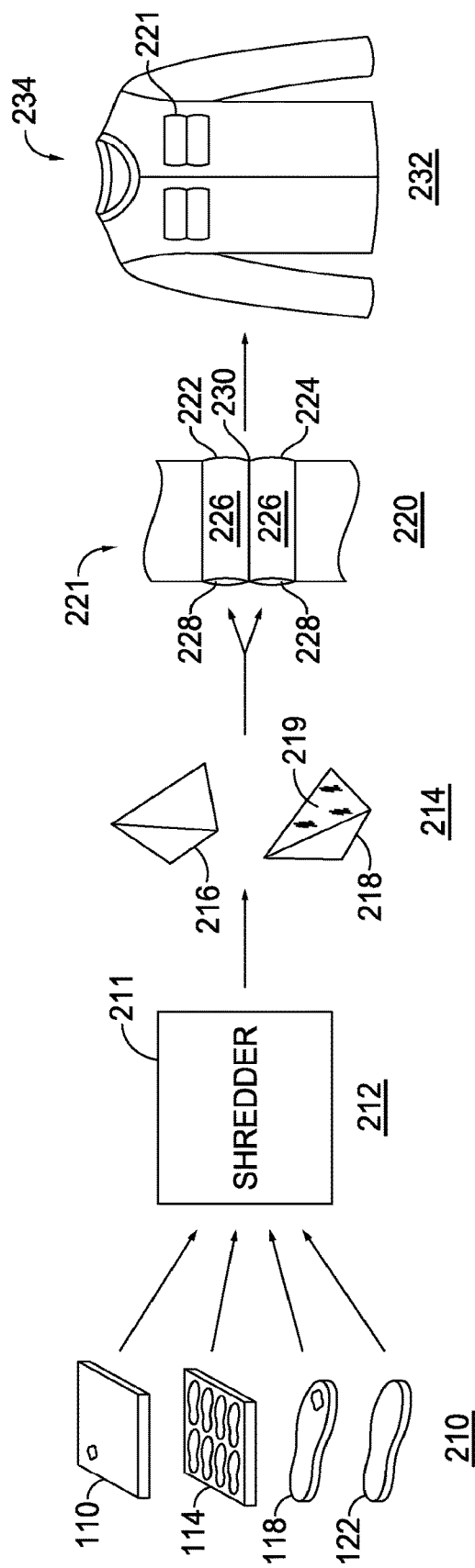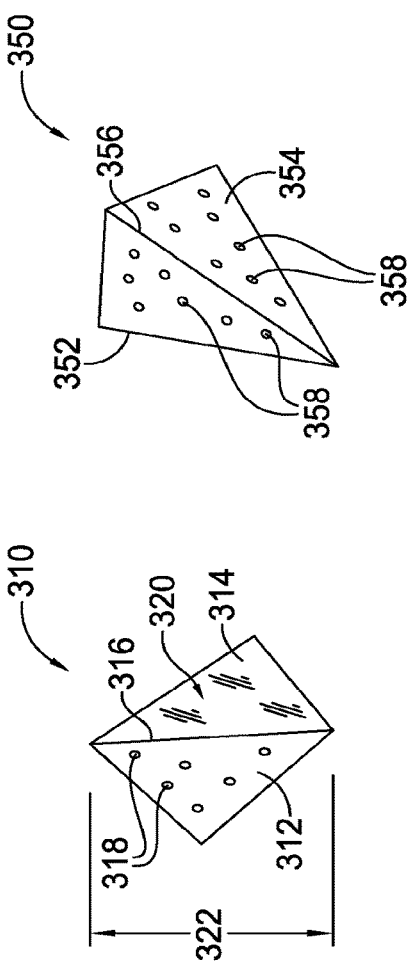

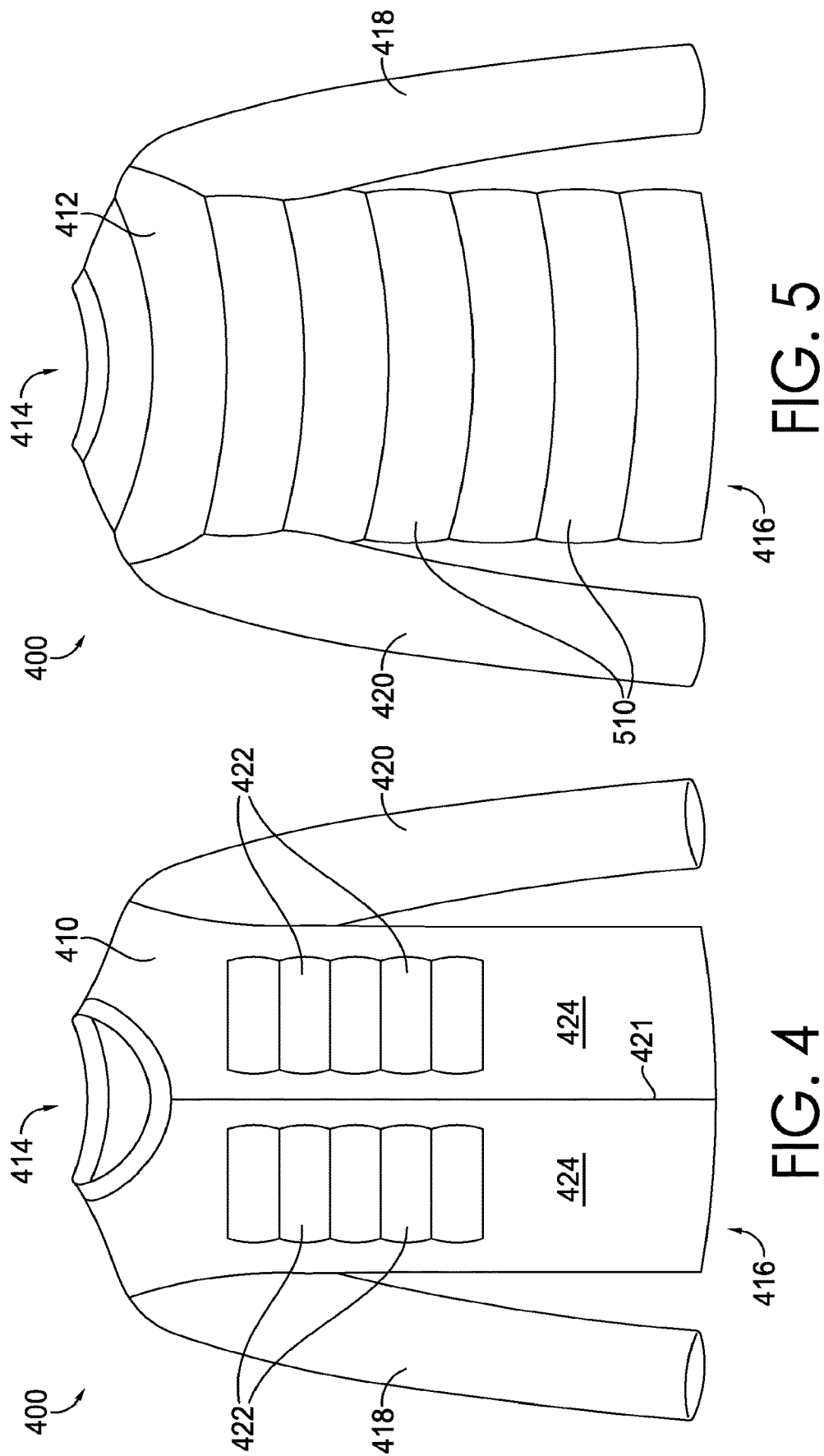

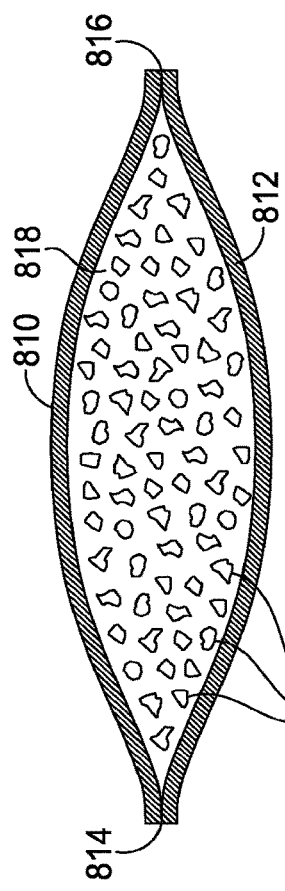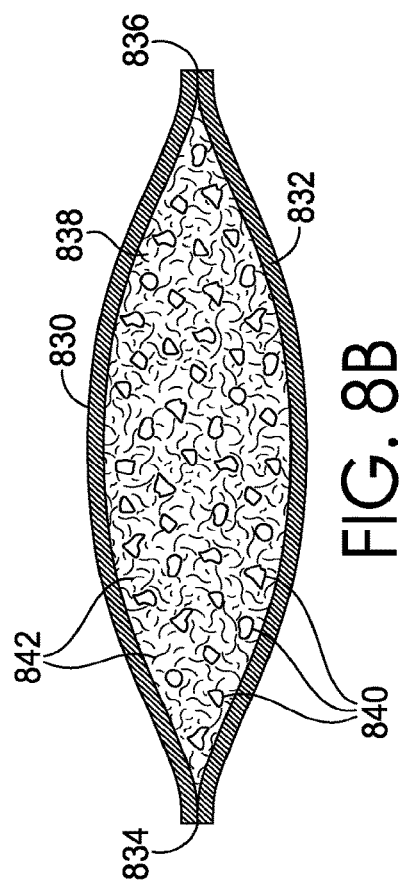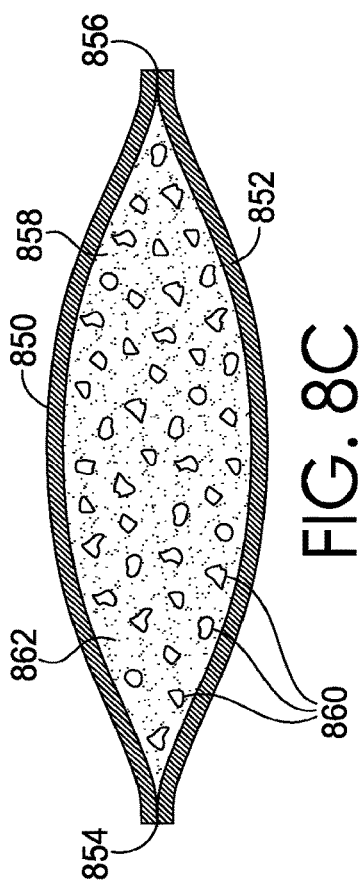

GARMENTS AND ARTICLES INCORPORATING RECYCLED FOAM SCRAP

CROSS-REFERENCE TO RELATED APPLICATIONS

This application claims the benefit of priority of U.S. App. No. 63/220,719 (filed Jul. 12, 2021). The entirety of the aforementioned application is incorporated by reference herein.

TECHNICAL FIELD

Aspects herein are directed to garments and articles that incorporate recycled foam scrap.

BACKGROUND

Foam scrap from, for example, components of articles of footwear and/or trim pieces from materials used to form components of articles of footwear is often not recycled or repurposed and may simply be discarded as trash which impacts the environment by needlessly reducing landfill capacity. Moreover, by not repurposing the scrap, new materials may need to be generated which increases the carbon footprint associated with articles that utilize the new materials.

BRIEF DESCRIPTION OF THE FIGURES

Examples of aspects herein are described in detail below with reference to the attached drawing figures, wherein:

FIG. 1 illustrates some example articles from which a plurality of multi-faceted foam particles may be derived in accordance with aspects herein;

FIG. 2 illustrates an example process flow for making a garment that includes a filling material comprising recycled foam particles in accordance with aspects herein.

FIGS. 3A and 3B illustrate example foam particles in accordance with aspects herein;

FIGS. 4 and 5 illustrate front and back views of an insulating upper-body garment that includes a filling material comprising recycled particles in accordance with aspects herein;

FIG. 8A illustrates a first example cross-section of a layered construction that includes a filling material comprising recycled particles in accordance with aspects herein;

FIG. 8B illustrates a second example cross-section of a layered construction that includes a filling material comprising recycled particles and additional filling materials in accordance with aspects herein; and FIG. 8C illustrates a third example cross-section of a layered construction that includes a filling material comprising recycled particles and a binder in accordance with aspects herein.

DETAILED DESCRIPTION

Figure 7:
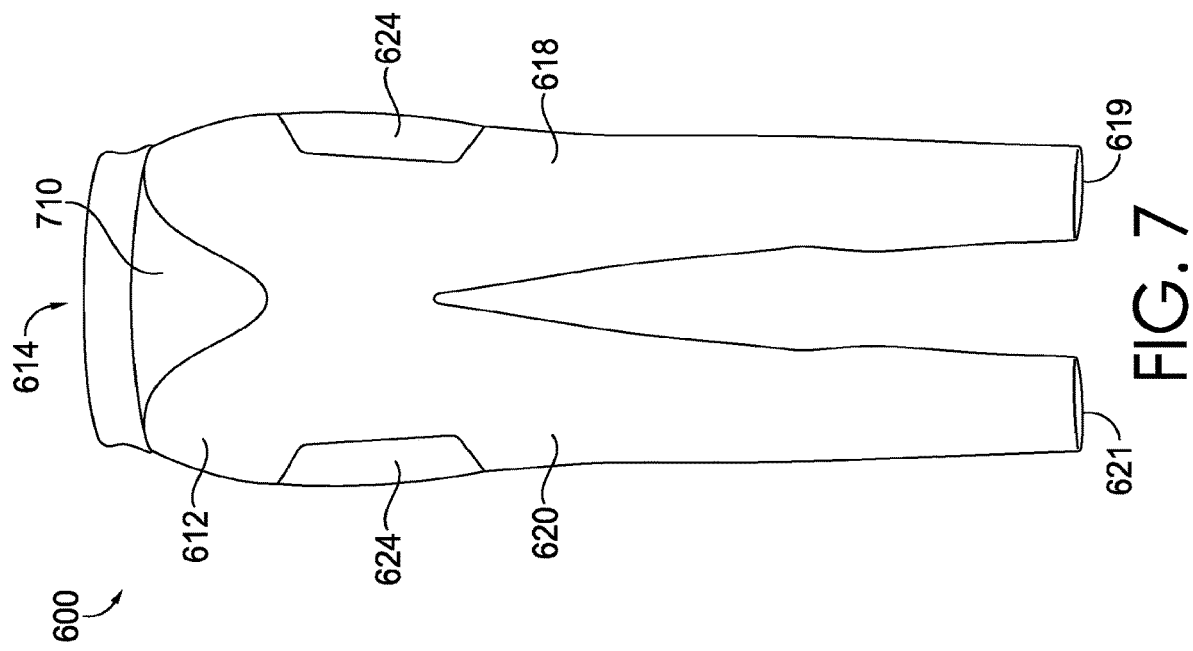
FIGS. 6 and 7 illustrate front and back views of a lower-body garment having pads that include a filling material comprising recycled particles in accordance with aspects herein.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Foam scrap from, for example, components of articles of footwear and/or trim pieces from materials used to form components of articles of footwear is often not recycled or repurposed and may simply be discarded as trash which impacts the environment by needlessly reducing landfill capacity. Moreover, by not repurposing the foam scrap, new materials may need to be generated which increases the carbon footprint associated with articles that utilize the new materials.

Aspects herein are directed to garments and methods of producing garments that incorporate filling materials that comprise multi-faceted particles, including multi-faceted foam particles, produced by shredding various components associated with, for example, articles of footwear, pads (athletic use pads, industrial use pads, and the like), and the like. Because the filling material comprises recycled particles, the carbon footprint associated with manufacturing the garment is reduced. Further, repurposing the materials by shredding reduces material waste.

In example aspects, the components associated with articles of footwear may include trim pieces from one or more foam sheets from which one or more footwear components have been removed, foam sheets designated to form footwear components that have been deemed defective, footwear components that have been deemed defective, and footwear components that have previously been incorporated into articles of footwear. The components may include, for example, foam sole structure components such as midsoles, outsoles, and combination midsoles/outsoles, along with other footwear components such as foam components used around an ankle collar of a footwear upper, in the tongue of a footwear upper, in the heel counter, and the like. It is further contemplated herein that foam components from other articles may be utilized including, for example, foam padding previously used for impact attenuation equipment or cushioning equipment (athletic garments, pad systems, and the like). Any and all aspects, and any variation thereof, are contemplated as being within the scope herein.

Utilizing foam components to form the filling material results in a number of advantages. For example, foam is generally lightweight having a low density which reduces the overall weight of a garment incorporating the same. Additionally, foam is generally soft which contributes to wearer comfort. In example aspects, particular foam compositions may be utilized herein to achieve additional advantages. For example, expanded foams having a cross-linked and closed-cell structure may be used. The cross-linked structure contributes to the overall strength of the foam allowing it to stretch, bear loads, and return to shape (e.g., high resilience) after pressure is applied. The closed-cell structure prevents or minimizes the absorption of water which helps the foam dry quickly and to retain its lightweight characteristics. Moreover, because there is minimal water absorption, bacterial growth over time is reduced or eliminated as compared to, for example, open-cell foam structures.

Foam compositions may be selected that have a relatively high melt temperature. This may prevent the foam particles from softening and sticking together when exposed to temperatures associated with washing and drying cycles thereby prolonging the life of a garment incorporating the foam particles. Foam compositions may also be selected that have long-term stability (i.e., do not degrade or minimally degrade over time) further prolonging the life of a garment incorporating the foam particles. As well, foam compositions may be selected that do not include chemicals that may cause skin irritation further enhancing wearer comfort. Additionally, when the foam particles are used for padding, material characteristics such as a high or low resilience may be selected. Some example foam compositions contemplated herein may compositionally comprise a poly-ether block amide copolymer, a thermoplastic copolyester material, a thermoplastic polyurethane, a thermoset polyurethane, a thermoplastic polyolefin copolymer, an ethylene vinyl acetate copolymer, or combinations thereof.

Shredding or transforming the foam components generally produces multi-faceted foam particles which, in turn, provide a number of advantages. For example, the irregular shape of the foam particles may help to "lock" the particles into place and minimize shifting or drifting of the particles during wear. Stated differently, a facet from one particle may be oriented such that it is in non-parallel alignment with a facet from an adjacent particle (e.g., the facets of opposing particles may be oriented generally perpendicular or otherwise angularly offset to each other). This configuration minimizes the facets moving or shifting relative to each other although the particles are unaffixed to each other. Additionally, the shredding process may generally produce facets with a relatively rough texture that have a relatively high coefficient of friction relative to one another to further assist in the minimized shifting. When the rough facets of one particle engage with the rough facets of an adjacent particle, frictional forces may further help to maintain the particles in position. When additional filling materials such as synthetic fibers or down (e.g., feathers) are used, the irregular shape and rough facets may also help to lock in place the synthetic fibers or down which also reduces shifting or drifting of the filling materials. The irregular multi-faceted particles may also allow for incorporating a greater amount of filling material within a given volume as the different facets of the particle "nest" with respect to one another and reduce free space between the particles. Compare this to, for example, filling materials comprised of spherical particles which may leave a greater amount of unused space due to the spherical shape of the particles. In example aspects, shredding parameters may be selected to achieve a particle size suitable for an intended end use. For example, a small particle size (e.g., about 2 mm) may be selected to allow for a greater number of fill particles per given volume while a large particle size (e.g., about 10 mm) may be selected to allow for a fewer number of fill particles per given volume.

As used herein, the term "garment" may encompass any type of upper-body garment or lower-body garment. Example upper-body garments may include, for example, jackets, coats, hoodies, pullovers, vests, shirts, compression shirts, and the like. Example lower-body garments may include, pants, tights, shorts, compression pants, capris, unitard, singlets, and the like. The term garment may also encompass articles worn by a wearer such as pad equipment (knee pads, elbow pads, shoulder pads, and the like) used in athletic apparel and/or in industry applications.

The term "inner" when referring to a layer of a garment means a layer closer to an intended body surface of a wearer compared to an outer layer when viewed from an as-worn state. Stated differently, an inner layer may be positioned adjacent to a body surface of a wearer while an outer layer may face toward an external environment. In some aspects, the inner layer may comprise an innermost layer of a garment and the outer layer may comprise an outermost layer of the garment.

The term "article of footwear" as used herein generally refers to an article worn on the foot of a wearer. The article of footwear may include a number of different elements including, for example, an upper and a sole structure. The upper is secured to the sole structure and forms a void on the interior of the footwear for receiving a wearer's foot. The sole structure is secured to a lower surface of the upper so as to be positioned between the upper and the ground. In some example aspects, the sole structure may include a midsole and an outsole. The midsole may be formed from a polymer foam material that attenuates ground reaction forces during walking, running, and other ambulatory activities. The outsole is secured to a lower surface of the midsole and forms a ground-engaging portion of the sole structure and may be formed from a durable and wear-resistant material. In some example aspects, the sole structure may include a combination midsole and outsole with no visible demarcation between the midsole and the outsole such that the midsole and outsole may be formed from a same material (e.g., a same polymer foam material). The term "array" when used in relation to an array of components means a range or a number of components to be incorporated into, for example, a particular type of article such as articles of footwear. The array may include components having a range of sizes and/or shapes. For instance, an array of component may include midsoles in a range of sizes and shapes. The term "array" when used in relation to an array of articles of footwear means articles of footwear in a range of sizes or configurations.

The term "multi-faceted" when referring to a particle means a particle having four or more surfaces or sides that are angularly offset with respect to one another. Stated differently, adjacent facets on a particle may share a common edge but the facets may be angularly offset with respect to one another. In some example aspects, the particle may include an irregular shape, while in other example aspects, the particle may have a regular shape (e.g., a cube). In some example aspects, one or more of the facets may be generally planar while in other example aspects, the facets may include surface irregularities including curves such that the facet is not planar. It is contemplated herein that a particular particle may include planar facets, non-planar facets, and a combination of planar and non-planar facets. As well, the facets of a particle may each have the same surface area (e.g., a cube) or one or more of the facets may have different surface areas. The term "unaffixed" when referring to the multi-faceted particles means two particles in mechanical interaction with one another that may be separated with opposing forces without sacrificing the mechanically-interacting surfaces of either particle.

Various terms may be used when describing the characteristics of one or more facets of a particle such as gloss, texture, the presence or absence of pores, and the like. In some example aspects, when the particles are derived from a molded component, one or more facets of a particle may include a portion of an outer surface of the molded component. As is known in the art of molding, the outer surface of a molded component generally includes a "skin" formed through the interaction of a polymer composition forming the molded article with a molding surface of a mold during the molding process (e.g., varied cooling of the polymer composition at the molding surface relative to a cooling of an interior volume of the molded article separated from the molding surface). The skin-containing facet may have characteristics that are different from other facets on the particle due to the film-like structure of the skin. For example, the skin-containing facet(s) may have a higher gloss than remaining facets formed through the shredding process. In general, facets having a high gloss may reflect light to a greater extent than facets with a low gloss. In example aspects, gloss can be measured using a gloss meter that provides quantifiable gloss measurements, expressed as gloss units. In example aspects, the gloss meter measures gloss by directing a constant intensity light beam at a fixed angle on to a test surface (e.g., a particular facet of a particle) and measures the amount of reflected light from the same angle (known as specular reflectance). A particular facet may have a higher gloss than another facet on the particle if the gloss units of the higher gloss facet exceed the gloss units of the lower gloss facets by a predefined amount such as greater than five gloss units.

In another example, the skin-containing facet(s) may have less pores or no pores compared to the remaining facets formed through the shredding process. In example aspects, the term "pore" refers to an exposed interior of a cell of a foam particle. Since the skin is formed through heating the foam composition to a molten state and subsequently cooling the foam composition, the cells in this area are more likely to be sealed such that the interior of the cells are not visible. By contrast, although aspects herein contemplate using scrap from components formed from a closed cell foam, one or more cells on remaining facets of the particles (i.e., facets not formed from a skin portion of the foam) may be opened or disrupted through the shredding process creating visible pores. In example aspects, the pores may be visible to the naked eye or may be visible using, for instance, a microscope.

In yet another example, the skin-containing facet(s) may have a texture corresponding to a pattern on a mold surface with which the skin-containing facet was in contact during the molding process while remaining facets of the particle may not include this particular texture. The texture may include a repeating pattern of elements, a random pattern of elements, and the like. In some examples, the texture on a skin-containing facet is an intentional texture that is molded in to the surface of the foam article and the texture of a non-skin containing facet is an unintentional texture generated based on the shredding process. Additional characteristics that may be associated with the skin-containing facet include a relatively smooth texture and a relatively lower coefficient of friction. Conversely, remaining facets of the particle may include a relatively rougher texture due to the mechanical shredding process and a relatively higher coefficient of friction. The inclusion of a facet formed from a skin surface, in some examples, allows for the inclusion of a lower porosity facet to reduce potential intrusion of bacteria while other non-skin containing facets allow for the mechanical interaction to one another for limiting shift of the particles.

Various measurements may be provided herein relating to the particles and/or components from which the particles are derived including hardness, size, density, and the like. With respect to size, the size of a particular particle may be measured using a precision caliper. In example aspects, the size may be measured across a longest dimension of the particle. Hardness of a component or particle may be measured using the ASTM 2240 test standard using, for instance, an Asker CL 150 durometer. Density of a component or particle may be measured using, for example, the ASTM D-792 00 test standard. With respect to resilience of a foam, resilience may be measured using, for example, the ASTM D3574-Test H test standard. In this testing method, a ball is dropped onto the foam from a given height and the height to which the ball returns is measured where the bounce height is directly correlated with the resilience of the foam. The scale is 0-100 with higher values correlating to greater resilience and energy return of the foam and lower values associated with damping or impact attenuation features of the foam.

Unless otherwise noted, all measurements provided herein are measured at standard ambient temperature and pressure (25 degrees Celsius or 298.15 K and 1 bar).

FIG. 1 illustrates some example articles from which the multi-faceted particles described herein may be derived. The articles may include a foam slab or sheet 110 that has been designated to form a component of an article of footwear, where the foam sheet 110 has been deemed defective. The phrase "been designated to form a component of an article of footwear" may mean that one or more components may be removed from the foam sheet and incorporated into one or more articles of footwear. The foam sheet 110 may be deemed defective for any number of reasons including, for example, defects in the foam structure such as larger-than-desired bubbles, inclusions, pores, cellular structures or the like as indicated by reference numeral 112. The foam sheet 110 may also be deemed defective due to problems with shipment and storage. For example, problems with shipment and storage temperatures and moisture conditions (too hot, too cold, too humid, and the like) that impact the material properties of the foam sheet 110, foam chemical defects, and the like that cause the foam to fall outside of specification for the originally intended article while still being acceptable as foam filling material within a garment.

In example aspects, the foam sheet 110 may by unmolded (not previously subjected to a molding process) and have a substantially uniform density, a substantially uniform hardness, and may not include a foam skin. In example aspects, the foam sheet 110 may compositionally comprise, for example, a poly-ether block amide copolymer, a thermoplastic copolyester material, a thermoplastic polyurethane, a thermoset polyurethane, a thermoplastic polyolefin copolymer, or an ethylene vinyl acetate material although additional foam materials are contemplated herein. In example aspects, when the foam sheet 110 compositionally comprises a poly-ether block amide, the foam sheet 110 may have a substantially uniform Asker C Durometer hardness between about 34 and 46 or about 40. As used herein the term "about" means within ±5% of an indicated value. Further, when the foam sheet 110 compositionally comprises a poly-ether block amide, the foam sheet 110 may have a substantially uniform density between about 0.02 g/cm$^3$ and 0.09 g/cm$^3$, or between about 0.06 g/cm$^3$ and 0.07 g/cm$^3$. When the foam sheet 110 compositionally comprises a thermoplastic copolyester material, the foam sheet 110 may have a substantially uniform Asker C Durometer hardness between about 20 and 28 or about 25. Further, when the foam sheet 110 compositionally comprises a thermoplastic copolyester material, the foam sheet 110 may have a substantially uniform density between about 0.02 g/cm$^3$ and 0.09 g/cm$^3$, or between about 0.06 g/cm$^3$ and 0.07 g/cm$^3$.

As described further below with respect to FIG. 2, the foam sheet 110 may be shredded to form multi-faceted foam particles. In example aspects, when the foam sheet 110 compositionally comprises the poly-ether block amide, each of the resulting particles would have the substantially uniform Asker C Durometer hardness between about 34 and 46 or about 40 and the substantially uniform density between about 0.02 g/cm$^3$ and 0.09 g/cm$^3$, or between about 0.06 g/cm$^3$ and 0.07 g/cm$^3$. When the foam sheet 110 compositionally comprises the thermoplastic copolyester material, the resulting particles would have the substantially uniform Asker C Durometer hardness between about 23 and 28 or about 25 and the substantially uniform density between about 0.02 g/cm$^3$ and 0.09 g/cm$^3$, or between about 00.6 g/cm$^3$ and 0.07 g/cm$^3$.

The articles from which the multi-faceted foam particles may be derived may further include one or more trim pieces 114 where the one or more trim pieces represents leftover material from a foam sheet (similar to the foam sheet 110) from which one or more components for articles of footwear have been removed as indicated by empty spaces 116. Although the one or more trim pieces 114 are shown as having a unitary structure, it is contemplated herein that the one or more trim pieces 114 may include separate trim pieces unconnected to other trim pieces.

The one or more trim pieces 114 have the same composition as the foam sheet 110. As such, the one or more trim pieces 114 will have the same hardness and density values recited with respect to the foam sheet 110. For example, when the one or more trim pieces 114 compositionally comprise a poly-ether block amide, the one or more trim pieces 114 may have a substantially uniform Asker C Durometer hardness between about 34 and 46 or about 40. When the one or more trim pieces 114 compositionally comprise a poly-ether block amide, the one or more trim pieces 114 may have a substantially uniform density between about 0.02 g/cm$^3$ and 0.09 g/cm$^3$, or between about 0.06 g/cm$^3$ and 0.07 g/cm$^3$. When the one or more trim pieces 114 compositionally comprise a thermoplastic copolyester material, the one or more trim pieces 114 may have a substantially uniform Asker C Durometer hardness between about 20 and 28 or about 25. Further, when the one or more trim pieces 114 compositionally comprise a thermoplastic copolyester material, the one or more trim pieces 114 may have a substantially uniform density between about 0.02 g/cm$^3$ and 0.09 g/cm$^3$, or between about 0.06 g/cm$^3$ and 0.07 g/cm$^3$. The multi-faceted foam particles derived from the one or more trim pieces 114 would have the same features with respect to hardness and density as the multi-faceted foam particles derived from the foam sheet 110.

The articles from which the multi-faceted foam particles are derived may further include components for articles of footwear that have been deemed defective such as the molded sole structure component 118. Similar to the foam sheet 110, the sole structure component 118 may be deemed defective due to the presence of irregularities in the foam structure as indicated by reference numeral 120. The sole structure component 118 may also be deemed defective due to, for instance, irregularities in the molding process used in forming the sole structure component 118, problems with shipment and storage include problems with shipment and storage temperatures and moisture conditions (too hot, too cold, and the like) that impact the material properties of the sole structure component 118, foam chemical defects, and the like.

In example aspects, the sole structure component 118 may be derived from a foam sheet having the same composition as the foam sheet 110. For example, a sole structure blank may be removed from a foam sheet and then subjected to a molding process that molds the sole structure blank into the sole structure component 118 having a desired end form. As stated earlier, the molding process may produce a mold skin on the surface of the sole structure component 118. Moreover, the molding process may compress the sole structure blank causing it to have, for example, different hardness and density characteristics as compared to the foam sheet from which the sole structure component 118 is derived. In some aspects, the molding and compression of the sole structure blank may not be uniform such that different portions of the sole structure component 118 may have different degrees of hardness and/or different densities. For example, the sole structure component 118 may have a first portion with a first average density and a second portion with a second average density, where the second average density is greater than the first average density. Further, the sole structure component 118 may have a third portion with a first average hardness and a fourth portion with a second average hardness, where the second average hardness is greater than the first average hardness. In aspect, the third portion and the first portion may be the same, and the fourth portion and the second portion may be the same. In example aspects, multi-faceted foam particles derived from the sole structure component 118 may include a range of densities and hardnesses corresponding to the different portions of the sole structure component 118 described above.

When the sole structure component 118 compositionally comprises a poly-ether block amide, the sole structure component 118 may have an average Asker C Durometer hardness between about 47 and 51, or about 49. When the sole structure component 118 compositionally comprises a poly-ether block amide, the sole structure component 118 may have an average density between about 0.1 g/cm$^3$ and 0.2 g/cm$^3$. When the sole structure component 118 compositionally comprises a thermoplastic copolyester material, the sole structure component 118 may have an average Asker C Durometer hardness between about 36 and 40, or about 38. Further, when the sole structure component 118 compositionally comprises a thermoplastic copolyester material, the sole structure component 118 may have an average density between about 0.1 g/cm$^3$ and 0.2 g/cm$^3$.

The sole structure component 118 may be shredded to form multi-faceted foam particles. In example aspects, when the sole structure component 118 compositionally comprises the poly-ether block amide, the resulting particles would have an average Asker C Durometer hardness between about 47 and 51, or about 49 and an average density between about 0.1 g/cm$^3$ and 0.2 g/cm$^3$. When the sole structure component 118 compositionally comprises the thermoplastic copolyester material, the resulting particles would have an average Asker C Durometer hardness between about 36 and 40, or about 38 and an average density between about 0.1 g/cm$^3$ and 0.2 g/cm$^3$.

The articles from which the multi-faceted foam particles may be derived may also include a sole structure component 122 from an article of footwear 124. The article of footwear 124 may include defective stock, overstock, as well as previously worn articles of footwear that have been provided by the consumer for recycling. The sole structure component 122 may be separated from, for instance, the upper of the article of footwear 124 and subsequently shredded. In aspects, where the sole structure component 122 includes materials and/or structures that are not desired (e.g., plates, and the like), these materials and/or structure may first be removed before shredding. In example aspects, if the article of footwear 124 includes additional foam components such as, for example, foam inserts surrounding the shoe collar, foam inserts in the shoe tongues, foam inserts in the heel counter, and the like, these may also be removed from the article of footwear 124 and recycled to form foam scrap.

The sole structure component 122 may have the same composition as the sole structure component 118. As such, the sole structure component 122 will have generally the same hardness and density values recited with respect to the sole structure component 118. When the sole structure component 122 compositionally comprises a poly-ether block amide, the sole structure component 122 may have an average Asker C Durometer hardness between about 47 and 51, or about 49. When the sole structure component 122 compositionally comprises a poly-ether block amide, the sole structure component 122 may have an average density between about 0.1 g/cm$^3$ and 0.2 g/cm$^3$. When the sole structure component 122 compositionally comprises a thermoplastic copolyester material, the sole structure component 122 may have an average Asker C Durometer hardness between about 36 and 40, or about 38. Further, when the sole structure component 122 compositionally comprises a thermoplastic copolyester material, the sole structure component 122 may have an average density between about 0.1 g/cm$^3$ and 0.2 g/cm$^3$. In example aspects, multi-faceted foam particles derived from the sole structure component 122 may include a range of densities and hardnesses corresponding to the different portions of the sole structure component 122 described above.

Although the articles depicted in FIG. 1 relate to articles of footwear, it is contemplated herein that the articles may include foam articles outside of the footwear space. For example, the articles may include foam sheets designated to form athletic pads or industrial use pads that have been deemed defective, trim pieces from foam sheets designated to form athletic pads or industrial use pads, molded athletic pads or industrial use pads that have been deemed defective, molded athletic pads or industrial use pads that have been previously used or represent overstock, and the like. Additional foam articles may include foam components used in, for example, furniture, the auto industry, and the like. In yet another example, the multi-faceted foam particles may include particles previously used as filling material in garments. For example, a wearer may return for recycling a garment having recycled foam particles as a filling material. The foam particles may be removed and used as filling material for a new garment.

FIG. 2 depicts a schematic of an example process for forming a garment having a filling material that comprises a plurality of multi-faceted particles. At a step 210, articles, such as the articles 110, 114, 118, and 122 are fed into a shredder 211 as shown at step 212. Although a shredder is depicted, other ways of transforming the articles into multi-faceted particles are contemplated herein. The shredder 211 cuts or tears the articles 110, 114, 118, and 122 into multi-faceted particles using, for example, rotating shafts, blades, and the like. The duration of the shredding process may be adjusted to produce a desired particle size. For example, longer shredding times may produce smaller particles (e.g., 2 mm or less), while shorter shredding times may produce larger particles (e.g., 10 mm or more). In example aspects, shred times may be further adjusted to achieve a desired particle size while minimizing energy expenditures incurred during the shredding process. After shredding, the particles may pass through a screen having a desired mesh size to further select a desired particle size. Particles that are larger than the desired mesh size may be introduced to the shredder again to achieve the desired mesh size.

In example aspects, the shredder 211 may generate heat during the shredding process. In example aspects, the composition of the foam forming the articles 110, 114, 118, and 122 may be selected to minimize softening of the foam during the shredding process as this may lead to particles sticking together or the article being more difficult to shred. For example, as described above, the articles 110, 114, 118, and 122 may compositionally comprise a poly-ether block amide copolymer and/or a thermoplastic copolyester material both of which have melt temperatures from about 155° C. to about 170° C. These high melt temperatures minimize softening of the foam during shredding which results in a more efficient and less energy intensive shredding process.

Step 214 indicates two example multi-faceted foam particles 216 and 218 produced by the shredder 211. In example aspects, the particles 216 and 218 may compositionally comprise the same or different materials depending on the materials used to form the articles 110, 114, 118, and 122. For example, the particles 216 and 218 may compositionally comprise a poly-ether block amide copolymer, a thermoplastic copolyester material, a thermoplastic polyurethane, a thermoset polyurethane, a thermoplastic polyolefin copolymer, an ethylene vinyl acetate copolymer, or combinations thereof. As such, in example aspects, the particles 216 and 218 may have an average Asker C Durometer hardness ranging from about 20 to about 70 and have an average density ranging from about 0.02 g/cm$^3$ to about 0.2 g/cm$^3$. With respect to the multi-faceted foam particle 218, a facet 219 may represent a skin surface of a molded component such as the article 118 and/or the article 122. The shading indicates that the facet 219 has a higher gloss than other facets due to the film-like surface of the facet 219.

At step 220, a garment portion 221 is formed by depositing the multi-faceted foam particles, such as the particles 216 and 218 within chambers 222 and 224 formed between an outer layer 226 and an inner layer 228, where the chambers 222 and 224 are separated by a seam 230. Additional details regarding the outer layer 226, the inner layer 228, and the seam 230 will be provided below. The multi-faceted foam particles may be positioned or deposited within the chambers 222 and 224 using various technologies including, for example, blowing the multi-faceted foam particles into the chambers 222 and 224, manually depositing the particles within the chambers 222 and 224, gravity-assisted deposition of the particles within the chambers 222 and 224, and the like.

Once deposited within the chambers 222 and 224, the particles may be substantially unaffixed from each other. For example, at least about 99% by volume of the particles are unaffixed from each other, about 95% by volume of the particles are unaffixed from each other, about 90% by volume of the particles are unaffixed from each other, about 80% by volume of the particles are unaffixed from each other, or about 70% by volume of the particles are unaffixed from each other. Stated differently the particles are generally freely movable relative to one another.

The number of particles deposited in the chambers 222 and 224 may be selected to achieve a desired fill volume. The size of the particles deposited in the chambers 222 and 224 may also be adjusted to achieve a desired fill volume and/or a desired fill weight. Although only the particles are shown as being deposited within the chambers 222 and 224, it is contemplated herein that additional filling materials may be deposited within the chambers in combination with the multi-faceted foam particles. The additional filling materials may include for example, down, loose synthetic fibers, a synthetic nonwoven sheet, expanded beads, and/or binder that binds the particles into a cohesive structure. Example binders may include, for example, a polyurethane binder.

At a step 232, the garment portion 221 is incorporated into a garment 234. The garment 234 is shown as an upper-body garment but additional garment types, such as lower-body garments are contemplated herein. The location of the garment portion 221 on the garment 234 is illustrative and it is contemplated that the garment portion 221 may be positioned at other locations on the garment 234 and/or may include additional chambers to create garment portions that make up a larger percentage of the garment 234.

FIG. 3A illustrates a first example multi-faceted particle 310 which may be produced by the process shown in FIG. 2. In example aspects, the particle 310 may be derived from a molded component such as the article 118 and/or the article 122. Two facets, facet 312 and facet 314 are depicted although the particle 310 may include additional facets not shown. The facets 312 and 314 are angularly offset with respect to each other and share a common edge 316. The facet 312 includes a plurality of pores 318 which represent an interior of a closed cell that has been exposed through the shredding process. The facet 314 does not include any pores and represents a portion of an outer skin surface of a molded component. Due to the lack of pores and further due to the molding process, the facet 314 has a higher gloss compared to remaining facets of the particle 310. The gloss is represented by shade lines 320. Aspects herein contemplate a higher gloss being associated with a lower porosity of the facet 314. As such, the facet 314 may be more resistant to water absorption which further limits bacterial in-growth of the particle 310.

FIG. 3B represents a second example multi-faceted foam particle 350 which may be produced by the process shown in FIG. 2. In example aspects, the particle 350 may be derived from any of the articles 110, 114, 118, and 122. Two facets, facet 352 and facet 354 are depicted although the particle 350 may include additional facets not shown. The facets 352 and 354 are angularly offset with respect to each other and share a common edge 356. Each of the facets 352 and 354 include pores 358. In example aspects, the particle 350 may not include any facets having a skin. In this example, the particle 350 may be from an interior portion of the molded articles 118 and 122. The particle 350 may also be derived from an outer surface or an interior portion of the unmolded articles 110 and 114. Because the particle 350 may not include any facets having a skin, each of the facets of the particle 350 may have a similar gloss level.

In example aspects, at least about 50% and up to 100% of the particles may have a size as measured across a longest dimension, such as the dimension 322 of the particle 310 ranging from about 2 mm to about 11 mm. Although the particles 310 and 350 are shown as each having a pyramidal shape, this is illustrative and the particles 310 and 350 may have other shapes including cube-like shapes, sphere-like shapes, and other types of irregular shapes having surfaces or facets angularly offset with respect to one another. Moreover, the particles 310 and 350 may each include a different shape relative to one another. In example aspects, the size and shape of the particles 310 and 350 may be random (i.e., not uniform). However, it is also contemplated herein that the particles 310 and 350 could be of uniform shape and/or size, of random shape and relatively uniform size, and vice versa.

FIGS. 4 and 5 illustrate front and back views respectively on an upper-body garment 400 having chambers containing a filling material comprising multi-faceted particles. The upper-body garment 400 includes a front torso portion 410 and a back torso portion 412 that together define a neck opening 414 and a waist opening 416. The upper-body garment 400 may further includes a first sleeve 418 and a second sleeve 420. Although the upper-body garment 400 is shown as a jacket/coat having a front closure 421, the upper-body garment 400 may be in the form of a vest, a jacket/coat with partial sleeves, a pullover, a hoodie, and the like. With respect to FIG. 4, the front torso portion 410 may include a first plurality of chambers 422 positioned on either side of the front closure 421 and located at an upper aspect of the front torso portion 410. The first plurality of chambers 422 contains a filling material such as the multi-faceted foam particles 310 and 350. In one example aspect, the first plurality of chambers 422 may be positioned on the upper-body garment 400 such that the first plurality of chambers 422 are configured to overlie areas of the human body needing higher amounts of insulation based on heat maps of the human body. In this aspect, the first plurality of chambers 422 may be in the form of "patches" or "pods" secured to one or more continuous garment layers such as garment layers 424.

With respect to FIG. 5, an alternative arrangement of chambers is depicted. The back torso portion 412 may include a second plurality of chambers 510 that collectively form the back torso portion 412. The second plurality of chambers 510 contains a filling material such as the multi-faceted foam particles 310 and 350. Instead of being in the form of patches or pods as with respect to the first plurality of chambers 422, the second plurality of chambers 510 form an entirety of the back torso portion 412 such that the back torso portion does not include a continuous garment layer without chambers. The first sleeve 418 and the second sleeve 420 are shown without chambers.

The arrangement of the chambers in FIGS. 4 and 5 is illustrative and is meant to convey the concept of a garment having chambers containing a filling material of multi-faceted foam particles where the chambers may be in the form of pods or patches secured to a continuous garment layer (e.g., the first plurality of chambers 422), and/or where the chambers may form an entirety of a garment portion (e.g., the second plurality of chambers 510).

The properties of the multi-faceted particles described herein make an ideal insulating fill material for a garment such as the garment 400. For example, the particles are lightweight reducing overall garment weight and are generally soft which contributes to wearer comfort. The closed cell structure of the particles helps to trap heated air which contributes to the insulating properties of the garment. The closed cell structure of the particles may also minimize the uptake of water/sweat which improves washability of the garment and inhibits or minimizes bacterial in-growth. The high melt temperatures of, for example, foam particles compositionally comprising a poly-ether block amide copolymer or a thermoplastic copolyester material allows the particles to withstand high temperatures associated with wash and dry cycles without the particles softening and sticking together. Moreover, foam particles compositionally comprising a poly-ether block amide copolymer or a thermoplastic copolyester material are generally stable with minimal to no degradation over time prolonging garment life. Further, particles compositionally comprising a poly-ether block amide copolymer or a thermoplastic copolyester material generally do not cause skin irritation. In addition, since the insulating filling material is formed from recycled articles, the carbon footprint associated with garments such as the garment 400 is generally lower than other garments that may not utilize a recycled filling material.

Figure 6:
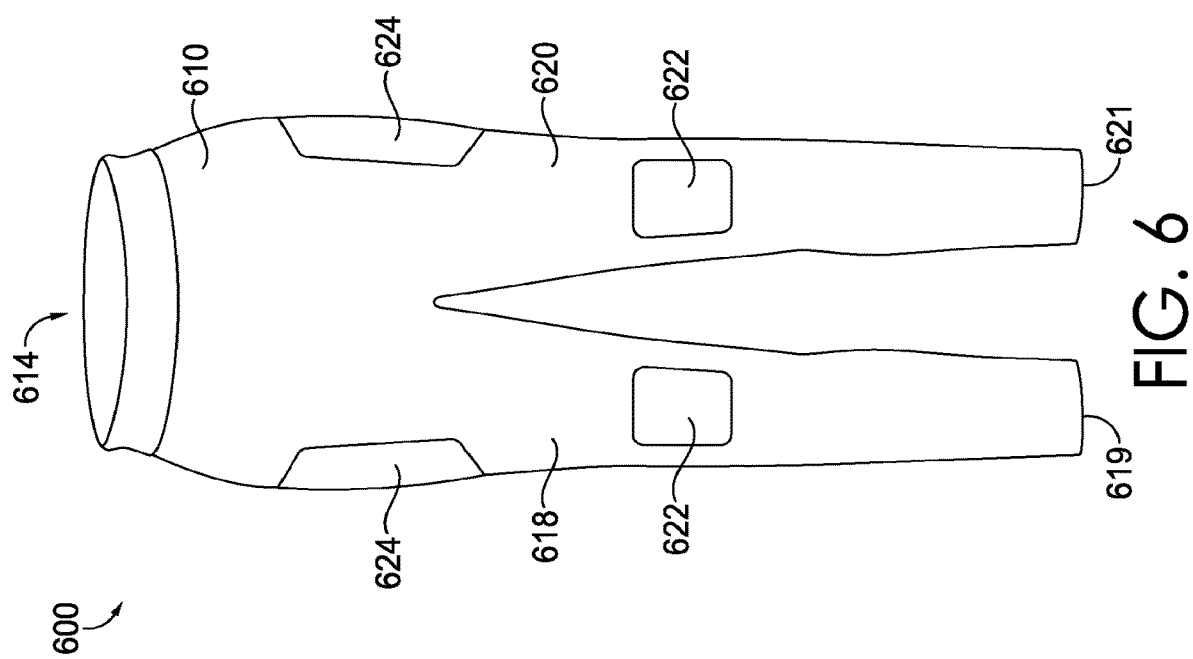

FIGS. 6 and 7 respectively depict front and back views of a lower-body garment 600 having chambers containing a filling material comprising multi-faceted particles. Instead of, or in addition to, the chambers acting as insulating portions of the lower-body garment 600, the chambers may act as pads to provide, for example, impact attenuation and/or energy rebound features for use in athletic wear and/or industrial wear (e.g., knee pads). The lower-body garment 600 includes a front torso portion 610 and a back torso portion 612 that together define a waist opening 614. The lower-body garment 600 may further includes a first leg portion 618 having a first leg opening 619 and a second leg portion 620 having a second leg opening 621. Although the lower-body garment 600 is shown as a pant, the lower-body garment 600 may be in the form of a short, a tight, a three-quarter pant, and the like.

With respect to FIG. 6, the lower-body garment 600 includes chambers 622 located at the knee areas of the lower-body garment 600 and chambers 624 located at the lateral hip areas of the lower-body garment 600. The chambers 622 and 624 may each comprise, for example, a single chamber that is filled with multi-faceted foam particles as shown in FIG. 6. It is also contemplated herein that the chambers 622 and 624 may include multiple chambers separated by seams similar to the construction shown in FIGS. 4 and 5. The back view of the lower-body garment 600 shown in FIG. 7 further depicts the chambers 624 wrapping around the lateral sides of the lower-body garment 600 and extending on to a posterior aspect of the lower-body garment 600. The back of the lower-body garment 600 further includes chamber 710 located adjacent the waist opening 614 and extending inferiorly such that the chamber 710 is configured to overlie a sacral area of a wearer when the lower-body garment 600 is worn. The location of the chambers 622, 624, and 710 is illustrative, and it is contemplated herein that chambers containing multi-faceted foam particles may be positioned at different locations on the lower-body garment 600. The positioning of the chambers 622, 624, and 710 may be based on impact maps of the human body for different sports and/or industrial applications.

The composition of the multi-faceted foam particles contained within the chambers 622, 624, and 710 may be based on a desired function of the respective chambers 622, 624, and 710 such as good energy return and/or good impact attenuation. For example, multi-faceted particles compositionally comprising a poly-ether block amide copolymer or a thermoplastic copolyester material may exhibit high resilience or energy return ranging from about 65 to about 85, from about 68 to about 80, or from about 70 to about 77. Multi-faceted particles compositionally comprising an ethylene vinyl acetate copolymer may exhibit low resilience making them suited for impact attenuation. For example, multi-faceted foam particles compositionally comprising an ethylene vinyl acetate copolymer may exhibit a resilience from about 10 to about 20, or from about 13 to about 17.

Further, similar to the garment 400, the particles are lightweight reducing overall garment weight. The closed cell structure of the particles may inhibit or minimize the uptake of water/sweat which improves washability of the garment and inhibits or minimizes bacterial in-growth. The high melt temperatures of, for example, foam particles compositionally comprising a poly-ether block amide copolymer or a thermoplastic copolyester material allows the particles to withstand high temperatures associated with wash and dry cycles, including industrial wash and dry cycles, without the particles softening and sticking together. Moreover, foam particles compositionally comprising a poly-ether block amide copolymer or a thermoplastic copolyester material are generally stable with minimal to no degradation over time prolonging garment life. Further, particles compositionally comprising a poly-ether block amide copolymer or a thermoplastic copolyester material generally do not cause skin irritation. In addition, since the filling material is formed from recycled articles, the carbon footprint associated with garments such as the garment 600 is generally lower than other garments that may not utilize a recycled filling material.

FIGS. 8A-8C depict cross-sections of example chambers containing a filling material comprising multi-faceted foam particles. FIG. 8A depicts a first example cross-section that includes an outer layer 810 and an inner layer 812 where the outer layer 810 and the inner layer 812 are secured to each other at seam 814 and seam 816. The outer layer 810 and the inner layer 812 may be secured to each other using various technologies such as stitching, welding, adhesives, bonding, and the like to form the seams 814 and 816. A chamber 818 is formed where the chamber 818 includes the space between the outer layer 810 and the inner layer 812 and between the seam 814 and the seam 816. In the example shown in FIG. 8A, the chamber 818 contains a filling material comprising a plurality of multi-faceted particles 820 where the multi-faceted particles 820 include foam particles derived from, for example, the process shown in FIG. 2. As provided herein, the outer layer 810 and/or the inner layer 812 may form portions of the garment beyond the chamber 818. Stated differently, it is contemplated that one or more layers that form the chamber 818 may also form other portions of the garment into which the chamber 818 is incorporated.

FIG. 8B depicts a second example cross-section that includes an outer layer 830 and an inner layer 832 secured to each other at seam 834 and seam 836. A chamber 838 formed by the outer layer 830 and the inner layer 832 contains a filling material where the filling material includes a plurality of multi-faceted particles 840 including multi-faceted foam particles along with an additional filling material referenced generally by the numeral 842. The additional filling material 842 may include, for example, down, loose synthetic fibers, a nonwoven web or sheet, and the like. The irregular shape of the multi-faceted particles 840 helps to generally secure the additional filling material 842 minimizing drift or shifting of the additional filling material 842. The additional filling material 842 may be used, for example, when enhanced insulation is desired.

FIG. 8C depicts a third example cross-section that includes an outer layer 850 and an inner layer 852 secured to each other at spaced apart seams 854 and 856. A chamber 858 is formed between the outer layer 850, the inner layer 852 and between the seams 854 and 856. The chamber 858 contains a filling material where the filling material includes a plurality of multi-faceted particles 860 including multi-faceted foam particles along with an additional filling material in the form of a binder 862. The binder 862 surrounds the multi-faceted particles and generally retains them in a fixed position. This is in contrast with other examples described herein where the particles are generally freely movable with respect to one another. The composition of the binder 862 may be selected to achieve desired properties such as, for example, compressibility. One example composition may comprise a polyurethane binder. The construction shown in FIG. 8C may be suitable for pad-type applications. In this example, the binder 862 may be mixed with the particles 860 when the binder 862 is in a liquid state. The mixture may be allowed to cure in a mold to produce a desired end shape that is then enclosed within the chamber 858. This is just one example, and other ways of forming the filling material comprising the particles 860 and the binder 862 are contemplated herein.

The following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are examples and are not limiting.

Clause 1. A garment comprising: an outer layer; an inner layer secured to the outer layer at one or more seam areas to form at least one chamber; and a filling material within the at least one chamber, the filling material comprising a plurality of multi-faceted foam particles.

Clause 2. The garment according to clause 1, wherein at least 90% by volume of the plurality of multi-faceted foam particles are unaffixed from each other.

Clause 3. The garment according to any of clauses 1 through 2, wherein at least a first subset of the plurality of multi-faceted foam particles has previously been incorporated into a first prior article.

Clause 4. The garment according to clause 3, wherein the first prior article includes a foam article designated to form a component of an article of footwear.

Clause 5. The garment according to any of clauses 3 through 4, wherein at least a portion of the first prior article has an average density ranging from about 0.02 g/cm$^3$ to about 0.09 g/cm$^3$.

Clause 6. The garment according to any of clauses 1 through 5, wherein at least a second subset of the plurality of multi-faceted foam particles has previously been incorporated into a second prior article.

Clause 7. The garment according to clause 6, wherein the second prior article includes a component of an article of footwear.

Clause 8. The garment according to any of clauses 6 through 7, wherein at least a portion of the second prior article has an average density ranging from about 0.1 g/cm$^3$ to about 0.2 g/cm$^3$.

Clause 9. The garment according to any of clauses 1 through 2, wherein at least a first subset of the plurality of multi-faceted foam particles has previously been incorporated into one or more trim pieces.

Clause 10. The garment according to clause 9, wherein the one or more trim pieces have an average density ranging from about 0.02 g/cm$^3$ to about 0.09 g/cm$^3$.

Clause 11. The garment according to any of clauses 1 through 10, wherein each foam particle of the plurality of multi-faceted foam particles includes at least four facets.

Clause 12. The garment according to any of clauses 1 through 11, wherein the plurality of multi-faceted foam particles compositionally comprise a poly-ether block amide copolymer, a thermoplastic copolyester material, a thermoplastic polyurethane, a thermoset polyurethane, a thermoplastic polyolefin copolymer, an ethylene vinyl acetate copolymer, or combinations thereof.

Clause 13. The garment according to any of clauses 1 through 12, wherein the plurality of multi-faceted foam particles have an average Asker C Durometer hardness ranging from about 20 to about 70.

Clause 14. The garment according to any of clauses 1 through 13, wherein at least an interior of each foam particle of the plurality of multi-faceted foam particles comprises an expanded foam with a closed-cell structure.

Clause 15. The garment according to any of clauses 1 through 14, wherein at least one facet of at least one foam particle of the plurality of multi-faceted foam particles has a higher gloss compared to remaining facets of the at least one foam particle.

Clause 16. The garment according to any of clauses 1 through 15, wherein the filling material further includes one or more of a nonwoven fill material, synthetic fibers, and down.

Clause 17. The garment according to any of clauses 1 through 16, wherein at least 50% of the plurality of multi-faceted foam particles have a size as measured across a longest dimension of a respective foam particle ranging from about 2 mm to about 11 mm.

Clause 18. A garment comprising: an outer layer; an inner layer secured to the outer layer at one or more seam areas to form at least one chamber; and a filling material within the at least one chamber, the filling material comprising a plurality of particles having an average Asker C Durometer hardness ranging from about 20 to about 70 and having an average density ranging from about 0.02 g/cm$^3$ to about 0.2 g/cm$^3$.

Clause 19. The garment according to clause 18, wherein the plurality of particles includes multi-faceted foam particles.

Clause 20. The garment according to any of clauses 18 through 19, wherein at least 90% by volume of the plurality of particles are unaffixed from each other.

Clause 21. The garment according to any of clauses 18 through 20, wherein at least a first subset of the plurality of particles has previously been incorporated into a first prior article.

Clause 22. The garment according to clause 21, wherein the first prior article includes a foam article designated to form a component of an article of footwear.

Clause 23. The garment according to any of clauses 21 through 22, wherein at least a portion of the first prior article has an average density ranging from about 0.02 g/cm$^3$ to about 0.09 g/cm$^3$.

Clause 24. The garment according to any of clauses 18 through 23, wherein at least a second subset of the plurality of particles has previously been incorporated into a second prior article.

Clause 25. The garment according to clause 24, wherein the second prior article includes a component of an article of footwear.

Clause 26. The garment according to any of clauses 24 through 25, wherein at least a portion of the second prior article has an average density ranging from about 0.1 g/cm$^3$ to about 0.2 g/cm$^3$.

Clause 27. The garment according to any of clauses 18 through 20 and clauses 24 through 26, wherein at least a first subset of the plurality of particles has previously been incorporated into one or more trim pieces.

Clause 28. The garment according to clause 27, wherein the one or more trim pieces have an average density ranging from about 0.02 g/cm$^3$ to about 0.09 g/cm$^3$.

Clause 29. The garment according to any of clauses 18 through 28, wherein each particle of the plurality of particles includes at least four facets.

Clause 30. The garment according to any of clauses 18 through 29, wherein the plurality of particles compositionally comprise a poly-ether block amide copolymer, a thermoplastic copolyester material, a thermoplastic polyurethane, a thermoset polyurethane, a thermoplastic polyolefin copolymer, an ethylene vinyl acetate copolymer, or combinations thereof.

Clause 31. The garment according to any of clauses 18 through 30, wherein at least an interior of each particle of the plurality of particles comprises an expanded foam with a closed-cell structure.

Clause 32. The garment according to any of clauses 18 through 31, wherein at least one facet of at least one particle of the plurality of particles has a surface without pores, and wherein remaining facets of the at least one foam particle have surfaces with pores.

Clause 33. The garment according to any of clauses 18 through 32, wherein the filling material further includes one or more of a nonwoven fill material, synthetic fibers, and down.

Clause 34. The garment according to any of clauses 18 through 33, wherein at least 50% of the plurality of particles have a size as measured across a longest dimension of a respective particle ranging from about 2 mm to about 11 mm.

Clause 35. A method of making a garment comprising an outer layer and an inner layer, the inner layer secured to the outer layer at one or more seam areas to form at least one chamber, the method comprising: transforming at least a portion of a first article having a foam composition into a first plurality of multi-faceted foam particles; and positioning the first plurality of multi-faceted foam particles within the at least one chamber.

Clause 36. The method of forming the garment according to clause 35, wherein the first article includes one or more trim pieces derived from a foam article designated to form an array of components for an array of articles of footwear.

Clause 37. The method of forming the garment according to clause 36, wherein the one or more trim pieces include a substantially uniform density.

Clause 38. The method of forming the garment according to clause 37, wherein the substantially uniform density is about 0.06 g/cm$^3$ to about 0.07 g/cm$^3$.

Clause 39. The method of forming the garment according to any of clauses 36 through 38, wherein the one or more trim pieces include a substantially uniform hardness.

Clause 40. The method of forming the garment according to clause 39, wherein the substantially uniform hardness has an Asker C Durometer hardness of about 40.

Clause 41. The method of forming the garment according to clause 39, wherein the substantially uniform hardness has an Asker C Durometer hardness of about 25.

Clause 42. The method of forming the garment according to any of clauses 35 through 41, wherein the first article includes one or more footwear components.

Clause 43. The method of forming the garment according to clause 42, wherein the first article includes a first portion having a first average density and a second portion having a second average density, the second average density greater than the first average density.

Clause 44. The method of forming the garment according to clause 43, wherein the first average density and the second average density range from about 0.1 g/cm$^3$ to about 0.2 g/cm$^3$.

Clause 45. The method of forming the garment according to any of clauses 42 through 44, wherein the first article includes a first portion having a first average hardness and a second portion having a second average hardness, the second average hardness greater than the first average hardness.

Clause 46. The method of forming the garment according to clause 45, wherein the first average hardness and the second average hardness have an Asker C Durometer hardness ranging from about 37 to about 50.

Clause 47. The method of forming the garment according to any of clauses 35 through 46, wherein at least the portion of the first article is transformed by shredding.

Clause 48. The method of forming the garment according to any of clauses 35 through 47, wherein the first article compositionally comprises a poly-ether block amide copolymer or a thermoplastic copolyester material.

Clause 49. The method of forming the garment according to any of clauses 35 through 48 further comprising: transforming at least a portion of a second article having a foam composition into a second plurality of multi-faceted foam particles; and positioning the second plurality of multi-faceted foam particles within the at least one chamber.

Clause 50. The method of forming the garment according to clause 49, wherein the first article includes one or more trim pieces derived from a foam article designated to form an array of components for an array of articles of footwear, and wherein the second article includes one or more footwear components.

Clause 51. A method of making a garment comprising an outer layer and an inner layer, the inner layer secured to the outer layer at one or more seam areas to form at least one chamber, the method comprising: transforming at least a portion of a first article having a foam composition into a first plurality of multi-faceted foam particles; transforming at least a portion of a second article having a foam composition into a second plurality of multi-faceted foam particles; and positioning the first plurality of multi-faceted foam particles and the second plurality of multi-faceted foam particles within the at least one chamber.

Clause 52. The method of forming the garment according to clause 51, wherein the first article includes one or more trim pieces derived from a foam article designated to form an array of components for an array of articles of footwear.

Clause 53. The method of forming the garment according to clause 52, wherein the one or more trim pieces include a substantially uniform density.

Clause 54. The method of forming the garment according to clause 53, wherein the substantially uniform density is about 0.06 g/cm$^3$ to about 0.07 g/cm$^3$.

Clause 55. The method of forming the garment according to any of clauses 52 through 54, wherein the one or more trim pieces include a substantially uniform hardness.

Clause 56. The method of forming the garment according to clause 55, wherein the substantially uniform hardness has an Asker C Durometer hardness of about 40.

Clause 57. The method of forming the garment according to any of clauses 55 through 56, wherein the substantially uniform hardness has an Asker C Durometer hardness of about 25.

Clause 58. The method of forming the garment according to any of clauses 51 through 57, wherein the second article includes one or more footwear components.

Clause 59. The method of forming the garment according to clause 58, wherein the second article includes a first portion having a first average density and a second portion having a second average density, the second average density greater than the first average density.

Clause 60. The method of forming the garment according to clause 59, wherein the first average density and the second average density range from about 0.1 g/cm$^3$ to about 0.2 g/cm$^3$.

Clause 61. The method of forming the garment according to any of clauses 58 through 50, wherein the second article includes a first portion having a first average hardness and a second portion having a second average hardness, the second average hardness greater than the first average hardness.

Clause 62. The method of forming the garment according to clause 61, wherein the first average hardness and the second average hardness have an Asker C Durometer hardness ranging from about 37 to about 50.

Clause 63. The method of forming the garment according to any of clauses 51 through 62, wherein at least the portion of each of the first article and the second article is transformed by shredding.

Clause 64. The method of forming the garment according to any of clauses 51 through 63, wherein each of the first article and the second article compositionally comprises a poly-ether block amide co-polymer or a thermoplastic copolyester.

Clause 65. A garment comprising: an outer layer; an inner layer secured to the outer layer at one or more seam areas to form at least one chamber; and a filling material within the at least one chamber, the filling material comprising a plurality of multi-faceted closed-cell foam particles.

Clause 66. The garment according to clause 65, wherein the plurality of multi-faceted closed-cell foam particles comprise a cross-linked structure.

Clause 67. The garment according to any of clauses 65 through 66, wherein each of the plurality of multi-faceted closed-cell foam particles compositionally comprises a poly-ether block amide co-polymer or a thermoplastic copolyester.

Clause 68. The garment according to any of clauses 65 through 67, wherein the plurality of multi-faceted closed-cell foam particles has previously been incorporated into a prior article.

Clause 69. The garment according to clause 68, wherein the prior article includes one or more of a foam sheet designated to form one or more articles of footwear that has been deemed defective, one or more trim pieces derived from the foam sheet, a component of an article of footwear that has been deemed defective, and a component that has previously been incorporated into an article of footwear.

Clause 70. The garment according to clause 69, wherein the component of the article of footwear that has been deemed defective and the component that has previously been incorporated into the article of footwear include a sole structure component.

Clause 71. The garment according to any of clauses 65 through 70, wherein at least one facet of at least one particle of the plurality of multi-faceted closed-cell foam particles has one or more of a surface without pores, a first degree of gloss, and a texture corresponding to a mold surface.

Clause 72. The garment according to clause 71, wherein remaining facets of the at least one particle of the plurality of multi-faceted closed-cell foam particles has one or more of a surface with pores, and a second degree of gloss that is less than the first degree of gloss.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. A garment comprising:
an outer layer;
an inner layer secured to the outer layer at one or more seam areas to form at least one chamber; and
a filling material within the at least one chamber, the filling material comprising a plurality of multi-faceted foam particles having four or more facets, wherein adjacent facets share a common edge and form at least one acute angle; and
wherein the plurality of multi-faceted foam particles includes a first portion of multi-faceted foam particles and a second portion of multi-faceted foam particles, the first portion of multi-faceted foam particles having at least a first facet that includes a plurality of pores and a second facet that comprises entirely of an outer skin surface of a molded component, and the second portion of the multi-faceted foam particles having at least one facet that includes a plurality of pores.

2. The garment of claim 1, wherein at least 90% by volume of the plurality of multi-faceted foam particles are unaffixed from each other.

3. The garment of claim 1, wherein at least a first subset of the plurality of multi-faceted foam particles has previously been incorporated into a first prior article.

4. The garment of claim 3, wherein the first prior article includes a foam article designated to form a component of an article of footwear.

5. The garment of claim 4, wherein at least a portion of the first prior article has an average density ranging from about 0.02 g/cm$^3$ to about 0.09 g/cm$^3$.

6. The garment of claim 3, wherein at least a second subset of the plurality of multi-faceted foam particles has previously been incorporated into a second prior article.

7. The garment of claim 6, wherein the second prior article includes a component of an article of footwear.

8. The garment of claim 7, wherein at least a portion of the second prior article has an average density ranging from about 0.1 g/cm$^3$ to about 0.2 g/cm$^3$.

9. The garment of claim 1, wherein at least a first subset of the plurality of multi-faceted foam particles has previously been incorporated into one or more trim pieces.

10. The garment of claim 9, wherein the one or more trim pieces have an average density ranging from about 0.02 g/cm$^3$ to about 0.09 g/cm$^3$.

11. The garment of claim 1, wherein the plurality of multi-faceted foam particles compositionally comprise a poly-ether block amide copolymer, or a thermoplastic copolyester material.

12. The garment of claim 1, wherein each facet of the second portion of the multi-faceted foam particles includes a plurality of pores.

13. A garment comprising:
an outer layer;
an inner layer secured to the outer layer at one or more seam areas to form at least one chamber; and
a filling material within the at least one chamber, the filling material comprising a plurality of particles compositionally comprising a poly-ether block amide copolymer, or a thermoplastic copolyester material, having an average Asker C Durometer hardness ranging from about 20 to about 70 and having an average density ranging from about 0.02 g/cm$^3$ to about 0.2 g/cm$^3$, and a polyurethane binder,
wherein the plurality of particles includes a plurality of multifaceted foam particles, and wherein the plurality of multi-faceted foam particles includes a first portion of multi-faceted foam particles and a second portion of multi-faceted foam particles, the first portion of multi-faceted foam particles having at least a first facet that includes a plurality of pores and a second facet that comprises entirely of an outer skin surface of a molded component, and each facet of the second portion of the multi-faceted foam particles includes a plurality of pores.

14. The garment of claim 13, wherein the plurality of particles includes multifaceted foam particles.

15. The garment of claim 13, wherein at least 90% by volume of the plurality of particles are unaffixed from each other.

16. The garment of claim 13, wherein at least a first subset of the plurality of particles has previously been incorporated into a first prior article including a foam article designated to form a component of a first article of footwear.

17. The garment of claim 16, wherein at least a portion of the first prior article has an average density ranging from about 0.02 g/cm$^3$ to about 0.09 g/cm$^3$.

18. The garment of claim 16, wherein at least a second subset of the plurality of particles has previously been incorporated into a second prior article including a component of a second article of footwear.

19. The garment of claim 18, wherein at least a portion of the second prior article has an average density ranging from about 0.1 g/cm$^3$ to about 0.2 g/cm$^3$.

* * * * *